US009563445B2

(12) United States Patent
Desai et al.

(10) Patent No.: US 9,563,445 B2
(45) Date of Patent: Feb. 7, 2017

(54) REMOTE ASSISTANCE FOR MANAGED MOBILE DEVICES

(71) Applicant: Citrix Systems, Inc., Fort Lauderdale, FL (US)

(72) Inventors: Nitin Desai, Coral Springs, FL (US); Jaspreet Singh, Ft. Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 14/702,954

(22) Filed: May 4, 2015

(65) Prior Publication Data
US 2015/0319178 A1 Nov. 5, 2015

Related U.S. Application Data

(60) Provisional application No. 61/988,333, filed on May 5, 2014.

(51) Int. Cl.
*G06F 17/00* (2006.01)
*H04L 29/06* (2006.01)
(Continued)

(52) U.S. Cl.
CPC .......... *G06F 9/4443* (2013.01); *G06F 3/0481* (2013.01); *G06F 9/4445* (2013.01); *G06F 9/4446* (2013.01); *H04L 63/105* (2013.01); *H04L 67/025* (2013.01)

(58) Field of Classification Search
CPC .... G06F 9/4443; G06F 3/0481; G06F 9/4445; G06F 9/4446; H04L 63/105
(Continued)

(56) References Cited

U.S. PATENT DOCUMENTS 7,269,853 B1 * 9/2007 Dunn .................... H04L 63/102
726/27
8,272,030 B1 * 9/2012 Annan .................. G06F 21/604
705/26.1
(Continued)

FOREIGN PATENT DOCUMENTS

CN WO 2013123837 A1 * 8/2013 ............. H04L 67/08
WO 2013123837 A1 8/2013

OTHER PUBLICATIONS

Fabrizio Lamberti, A Streaming-Based Solution for Remote Visualization of 3D Graphics on Mobile Devices, IEEE, 2007. p. 247-260.*
(Continued)

*Primary Examiner* — Monjour Rahim
(74) *Attorney, Agent, or Firm* — Banner & Witcoff, Ltd.

(57) ABSTRACT

According to some aspects disclosed herein, a system for remote assistance and control of user devices subject to one or more remote assistance policies may be provided. In some embodiments, an administrator may request remote control of a managed user device. A managed application launcher may be provided by the user device and may be modified by the user device to remove managed applications or otherwise prevent access to applications that have a policy indicating that remote assistance is not allowed. The administrator may open a managed application included in the launcher and remotely control that application. In other embodiments, a user of the managed user device may initiate a request for remote assistance from within a managed application and/or the managed application launcher. The administrator's control of the user device and access to other applications on the user device may be limited based on the remote assistance policies.

20 Claims, 10 Drawing Sheets

(51) Int. Cl.
*G06F 9/44* (2006.01)
*G06F 3/0481* (2013.01)
*H04L 29/08* (2006.01)

(58) Field of Classification Search
USPC .......................................................... 726/1
See application file for complete search history.

(56) References Cited

U.S. PATENT DOCUMENTS

| | | | | |
|---|---|---|---|---|
| 8,935,429 | B2* | 1/2015 | Wilkinson | G06F 9/468 709/217 |
| 8,955,152 | B1* | 2/2015 | Enderwick | G06F 21/60 705/51 |
| 9,348,899 | B2* | 5/2016 | Simard | G06F 17/30705 |
| 2009/0106557 | A1* | 4/2009 | Leonard | H04L 12/585 713/179 |
| 2009/0327305 | A1* | 12/2009 | Roberts | G06F 17/30035 |
| 2010/0257596 | A1* | 10/2010 | Ngo | H04L 63/102 726/7 |
| 2011/0145927 | A1* | 6/2011 | Hubner | G06F 21/31 726/26 |
| 2011/0246891 | A1* | 10/2011 | Schubert | G06F 9/4445 715/719 |
| 2012/0005269 | A1* | 1/2012 | Janssen | G06F 3/0481 709/203 |
| 2012/0066738 | A1* | 3/2012 | Cohan | H04L 63/0263 726/1 |
| 2012/0096365 | A1* | 4/2012 | Wilkinson | G06F 9/468 715/740 |
| 2013/0174267 | A1* | 7/2013 | Kass | H04L 63/14 726/26 |
| 2013/0191885 | A1* | 7/2013 | Hubner | G06F 21/6218 726/5 |
| 2013/0246944 | A1* | 9/2013 | Pandiyan | G06F 9/54 715/760 |
| 2013/0263287 | A1* | 10/2013 | Ayyalasomayajula | H04W 8/245 726/30 |
| 2014/0094159 | A1* | 4/2014 | Raleigh | H04W 24/02 455/418 |
| 2014/0108794 | A1 | 4/2014 | Barton et al. | |
| 2014/0235203 | A1* | 8/2014 | Gonsalves | H04L 63/0823 455/410 |
| 2014/0258872 | A1* | 9/2014 | Spracklen | H04L 41/5009 715/736 |

OTHER PUBLICATIONS

IBM, "IBM R&D Labs in Israel News, MAGEN—the big cover up," 2 pages, available at <https://www.research.ibm.com/haifa/info/200904_MAGEN.shtml> (accessed dated Apr. 9, 2015).
Netflix, Inc., "DIAL for DIscovery and Launch," 2 pages (copyright 2012), available at <http://www.dial-multiscreen.org/> (accessed Apr. 9, 2015).
International Search Report (ISR) and Written Opinion, issued by the European Patent Office for International Application No. PCT/US2015/029143 dated Sep. 1, 2015.
Muller, N. J: Remote-Control Software Aids Help Desk Problem Resolution, International Journal of Network Management, Sep. 1994, pp. 120-129.

* cited by examiner

REMOTE ASSISTANCE FOR MANAGED MOBILE DEVICES

CROSS-REFERENCE TO RELATED APPLICATIONS

This application claims the benefit of U.S. Provisional Patent Application Ser. No. 61/988,333, filed May 5, 2014, and entitled "REMOTE ASSISTANCE FOR MANAGED MOBILE DEVICES," which is incorporated by reference herein in its entirety.

FIELD

Aspects of the disclosure relate to computer hardware and software. In particular, one or more aspects of the disclosure generally relate to computer hardware and software for providing remote assistance and control for managed mobile devices.

BACKGROUND

Various kinds of computing devices, from personal computers to mobile devices, are becoming increasingly popular. In addition, people are increasingly using these devices for both business purposes and personal uses. As these devices continue to grow in popularity and people continue to use them for an ever-growing number of reasons, the users of these devices have demanded and will continue to demand greater convenience, functionality, and ease-of-use from their computing devices and the computer software with which they interact.

Companies have increasingly turned to mobile devices as a way to provide employees with better access to enterprise services and resources. Users may be able to utilize personal devices to access enterprise resources through managed "bring your own device" (BYOD) programs. Through BYOD initiatives, managed applications and other services may be provided directly through a personal device of a user. These users may require troubleshooting or assistance from an administrator. In conventional work environments, for example, an administrator could remotely control a workstation of the user to provide assistance. However, personal devices used in a BYOD environment may contain personal data and applications, and users may not want to provide the administrator with access to the personal data and applications.

SUMMARY

Aspects of the disclosure relate to various systems and techniques that provide more flexibility, security, and functionality for managed computing devices and/or computer software, particularly in instances in which remote assistance is provided for a managed computing device that contains managed and unmanaged applications. In addition, certain aspects of the disclosure may provide particular advantages when used in a bring your own device (BYOD) setting where a user's personal mobile device can be used to provide managed applications and access to enterprise resources.

Some aspects of the disclosure generally relate to providing remote assistance for user computing devices in a managed environment while maintaining separation between personal data and managed spaces. Some aspects of the disclosure relate to various policies that may limit and/or control the data, applications, and/or features that may be accessed by an administrator providing remote assistance. In the description below, various examples illustrating how policy managed remote assistance may be provided in accordance with one or more embodiments will be discussed.

In a bring your own device (BYOD) environment, companies may desire to provide remote support and assistance to users accessing enterprise resources through managed applications. Users may encounter a variety of technical problems when utilizing managed applications, and these problems may be more readily solved through assistance from administrators and other support professionals. In a BYOD environment, users may have personal data and applications on their device and it may be unnecessary for the administrator to access this personal data. Further, the user may consider some of the personal data to be sensitive or private and may desire that it not be exposed to a remote administrator.

According to some aspects disclosed herein, a system for remote assistance and control of user devices subject to one or more remote assistance policies may be provided. In some embodiments, an administrator may request remote control of a managed user device. The administrator may be provided with access to a managed application launcher provided by the user device. The managed application launcher may be modified by the user device to remove managed applications or otherwise prevent access to applications that have a policy indicating that remote assistance is not allowed. The administrator may open a managed application included in the launcher and remotely control that application, in accordance with the remote assistance policies. In other embodiments, a user of the managed user device may initiate a request for remote assistance from within a managed application and/or the managed application launcher. An administrator or other support professional may respond and take control of the user device. The administrator's control of the user device and access to other applications on the user device may be limited based on the remote assistance policies.

Some aspects discussed herein relate to a method for providing remote assistance. The method may include initiating a remote assistance connection on a managed mobile device that has a remote assistance policy set. The remote assistance policy set may comprise one or more remote assistance policies, such as remote access policies, remote input policies, and screen content policies. The remote assistance connection may allow a remote user to control one or more applications on the managed mobile device by providing user input to the managed mobile device and/or the applications. In some embodiments, the remote assistance connection may be initiated in response to receiving a request for remote control from the remote user. For example, the request may be generated by a remote assistance support server operated by the remote user. One or more access policies of the remote assistance policy set may be consulted to determine whether the request for remote control should be granted. For example, an access policy may indicate that remote control is available for some applications on the managed mobile device but not others. As one example, an access policy may indicate that remote control is available for managed applications but not unmanaged applications. In other embodiments, the remote assistance connection may be initiated in response to receiving a request for remote control from a local user of the managed mobile device.

The managed mobile device may process user input received from the remote user based on policies in the remote assistance policy set, such as one or more remote input policies. In processing the user input, the managed mobile device may determine whether the user input is allowed based on an input policy of the remote assistance policy set. If the user input is allowed, the managed mobile device may provide the user input to an application, such as an application associated with the remote assistance connection and/or remote assistance request. For example, a remote input policy may specify and/or limit the types of actions that the remote user may perform, such as preventing the remote user from initiating a change password request or deleting files. As another example, the remote input policy may restrict and/or prevent the remote user from interacting with certain portions of a user interface associated with an application provided by the managed mobile device over the remote assistance connection.

The managed mobile device may send user interface updates to the remote user based on the remote assistance policy set. The user interface updates may correspond to a user interface of an application associated with the remote assistance connection and/or remote assistance request. For example, if the remote user initiates a remote assistance connection to help a local user with an email application, the user interface updates may correspond to a user interface of the email application. However, the managed mobile device may process user interface data associated with the application and may generate the user interface update based on one or more screen content policies of the remote assistance policy set. For example, a screen content policy may specify that portions of the user interface should be obscured and/or hidden from the remote user. As another example, a screen content policy may include a content rule that is operative to obscure content matching one or more criteria. This content rule may be applied by the managed mobile device to obscure sensitive information, such as passwords and social security numbers, for example.

In some embodiments, the remote user may request that a particular policy of the remote assistance policy set be bypassed and/or overridden during a remote assistance session. The managed mobile device and/or a remote support server may determine whether to approve the override request. For example, the managed mobile device may prompt a local user of the device to ask whether the local user approves the override of the policy. As another example, the managed mobile device and/or remote support server may determine whether the remote user is authorized to override the particular policy, such as by requesting a password or other suitable credentials. If the request to override the particular policy is approved, the managed mobile device may bypass the first policy during processing of user input from the remote user and during the generation and delivery of user interface updates for the remote user. In other embodiments, the remote user may request that the remote policy set be bypassed and/or overridden during the remote assistance session in a similar manner.

Some aspects described herein may relate to another method of providing remote assistance to a local user of a managed mobile device. The method may involve receiving a request to establish a remote assistance connection, wherein the request is associated with an application executing on the managed mobile device. The request may be initiated by a remote user and/or by a local user of the managed mobile device, in some embodiments. The method may involve determining whether to establish the remote assistance connection based on one or more remote assistance policies, such as one or more access policies of the remote assistance policy set described above. The managed mobile device may establish a remote assistance connection with the remote user based on an access policy of the remote assistance policies. The method may further involve receiving user input from the remote user and providing the user input to the application associated with the remote assistance connection based on the emote assistance policies. For example, the remote assistance policies may include one or more user input policies that govern the types of user input that the managed mobile device will accept from the remote user, such as preventing the remote user from deleting files. The method may further involve generating and/or sending user interface updates associated with the application to the remote user based on the remote assistance policies. For example, the remote assistance policies may include one or more screen content policies that specify how a user interface associated with the application should be modified prior to sending the user interface updates to the remote user, such as obscuring a portion of the user interface.

According to some aspects described herein, one or more of the remote access policies may have a local device scope and may be specified to apply to the individual managed mobile device. Other policies of the remote access policies may have a group and/or global device scope and may be specified to apply to a group of device and/or all devices in a managed device framework. According to other aspects described herein, the remote user may request to view an application launcher and/or to change an active application on the managed mobile device. In some embodiments, the managed mobile device may determine whether the remote access policies allow the remote user to change the active application and/or whether the new application is available for remote assistance. Based on this determination, the managed mobile device may allow or deny the request.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings identified above, which form a part hereof, and in which is shown by way of illustration various embodiments in which various aspects of the disclosure may be practiced. Other embodiments may be utilized, and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As noted above, certain embodiments are discussed herein that relate to providing remote assistance for managed applications on a user's personal device. Before discussing these concepts in greater detail, however, several examples of a computing device that may be used in implementing and/or otherwise providing various aspects of the disclosure will first be discussed with respect to FIG. 1.

Figure 1:
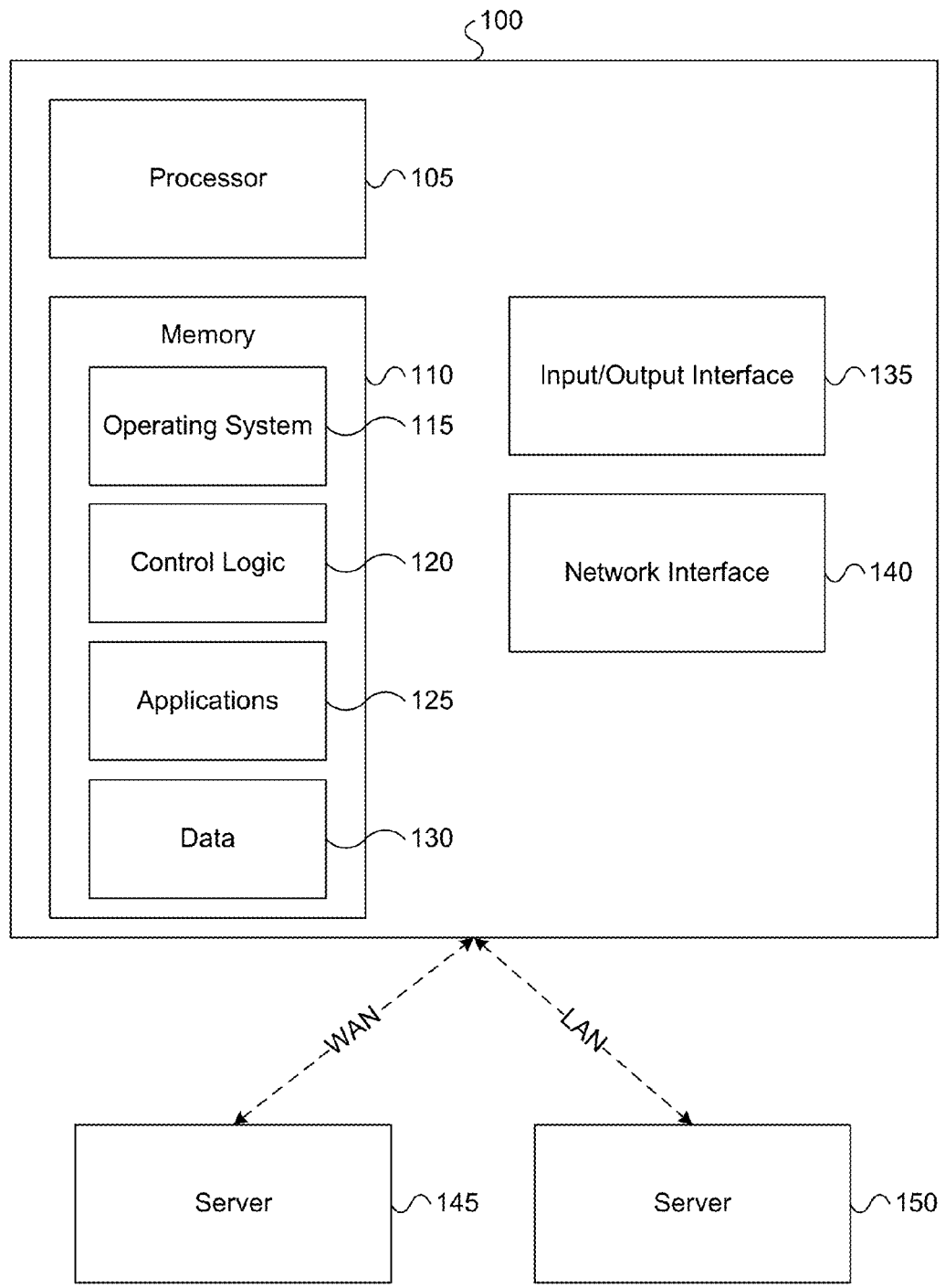
FIG. 1 depicts an example of a computing device that may be used in implementing one or more aspects of the disclosure in accordance with one or more illustrative aspects discussed herein.

FIG. 1 depicts an example of a computing device 100 that may be used in implementing one or more aspects of the disclosure in accordance with one or more illustrative aspects discussed herein. For example, computing device 100 may, in some instances, implement one or more aspects of the disclosure by reading and/or executing instructions and performing one or more actions accordingly. In one or more arrangements, computing device 100 may represent, be incorporated into, and/or include a desktop computer, a computer server, a mobile device (e.g., a laptop computer, a tablet computer, a smart phone, any other type of mobile computing device, etc.), and/or any other type of data processing device. Computing device 100 may, in some instances, operate in a standalone environment. In other instances, computing device 100 may operate in a networked environment. For example, computing device 100 may, in some instances, be connected to and/or otherwise in communication with one or more other computing devices that may be local to and/or physically remote from computing device 100.

As seen in FIG. 1, computing device 100 may, in some embodiments, include a processor 105, memory 110, an input/output interface 135, and a network interface 140. These are only some examples of the components and/or subsystems that may be included in computing device 100 in some embodiments. In other embodiments, computing device 100 may include two or more of any and/or all of these components (e.g., two or more processors, two or more memories, etc.) and/or other components and/or subsystems not listed here.

In some embodiments, processor 105 may control overall operation of computing device 100, including operation of one or more of the other components included in computing device 100, such as memory 110, input/output interface 135, and/or network interface 140. Memory 110 may, for instance, store software, instructions, data, and/or other information. For example, software may be stored in memory 110 and/or other storage to provide instructions to processor 105 for configuring the generic computing device 100 into a special purpose computing device in order to perform one or more of the various functions discussed herein.

In some arrangements, memory 110 may store, provide, and/or otherwise include an operating system 115, control logic 120, one or more applications 125, and/or data 130.

Operating system 115 may, for example, control overall operation of computing device 100. Control logic 120 may, for instance, instruct computing device 100 and/or various components included therein, including processor 105, to perform and/or otherwise provide various aspects of the disclosure. The one or more applications 125 may, for example, provide secondary, support, and/or other functionalities that may be used in conjunction with various aspects of the disclosure. Additionally, data 130 may, for instance, be used in performing one or more aspects of the disclosure and, in some instances, may include one or more databases, data tables, and/or the like.

In some arrangements, input/output interface 135 may include a keyboard, mouse, display, printer, scanner, optical reader, stylus, and/or one or more other components. For example, input/output interface 135 may include various interface units and/or drives for reading, writing, displaying, and/or printing files and/or other data. In some embodiments, input/output interface 135 may include an audio interface that includes one or more microphones for capturing audio input and/or one or more speakers for providing audio output. Additionally or alternatively, input/output interface 135 may include a video display device for providing textual, audiovisual, and/or graphical output.

In some embodiments, at least one display included in and/or otherwise provided by input/output interface 135 may be a touch-sensitive display screen (also known as a "touch screen"). Such a touch screen may, for instance, be configured to display graphical content rendered and/or otherwise generated by computing device 100. In addition, the touch screen may be configured to receive user input from a user of computing device 100, including touch-based user input provided by the user using a stylus, finger, or other pointing aspect that is operated, controlled, and/or otherwise used by the user of the computing device 100 to interact with the touch screen.

As indicated above, computing device 100 may, in some instances, operate in a networked environment supporting connections to one or more remote computers, servers, and/or devices. Such connectivity may, in some embodiments, be provided by network interface 140. For example, network interface 140 may include one or more communication interfaces, ports, adapters, antennas, and/or other elements to facilitate various network connections. Such network connections may include local area network (LAN) connections, wide area network (WAN) connections (e.g., to the Internet), and/or any other types of connections. In some arrangements, LAN connections may be established and/or provided via a dedicated LAN interface and/or adapter, and/or WAN connections may be established and/or provided via a dedicated WAN interface and/or adapter. Other connections may, for example, be established and/or provided via other communication interfaces, such as wired communication interfaces (e.g., Ethernet), wireless communication interfaces (e.g., wireless LAN (WLAN), cellular, Bluetooth, etc.), and/or other communication interfaces.

As seen in FIG. 1, computing device 100 may, in some instances, be connected to and/or in communication with one or more servers, such as server 145 and server 150. Such servers may, for instance, implement one or more aspects of computing device 100 and, accordingly, may include one or more processors, memories, and/or the like. Some connections to the one or more servers may be established via a LAN (e.g., the connection between computing device 100 and server 145), while other connections to the one or more servers may be established via a WAN (e.g., the connection between computing device 100 and server 150). In some embodiments, some or all of the one or more servers may be virtual servers that are provided by software being executed on one or more computing devices.

In addition, one or more aspects of the disclosure may be embodied in computer-usable or readable data and/or computer-executable instructions, such as in one or more program modules, executed by one or more computers or other devices as discussed herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as discussed herein may be transferred between a source and a destination in the form of electromagnetic waves traveling through signal-conducting media such as metal wires, optical fibers, and/or wireless transmission media (e.g., air and/or space). Various aspects discussed herein may be embodied as a method, a data processing system, or a computer program product. Therefore, various functionality may be embodied in whole or in part in software, firmware, and/or hardware or hardware equivalents such as integrated circuits, field programmable gate arrays (FPGA), and the like. Particular data structures may be used to more effectively implement one or more aspects of the disclosure, and such data structures are contemplated as being within the scope of computer executable instructions and computer-usable data discussed herein.

Further, some aspects of the disclosure may also be operational with numerous other general purpose or special purpose computing system environments or configurations. Examples of other computing systems, environments, and/or configurations that may be suitable for use with aspects discussed herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 2:
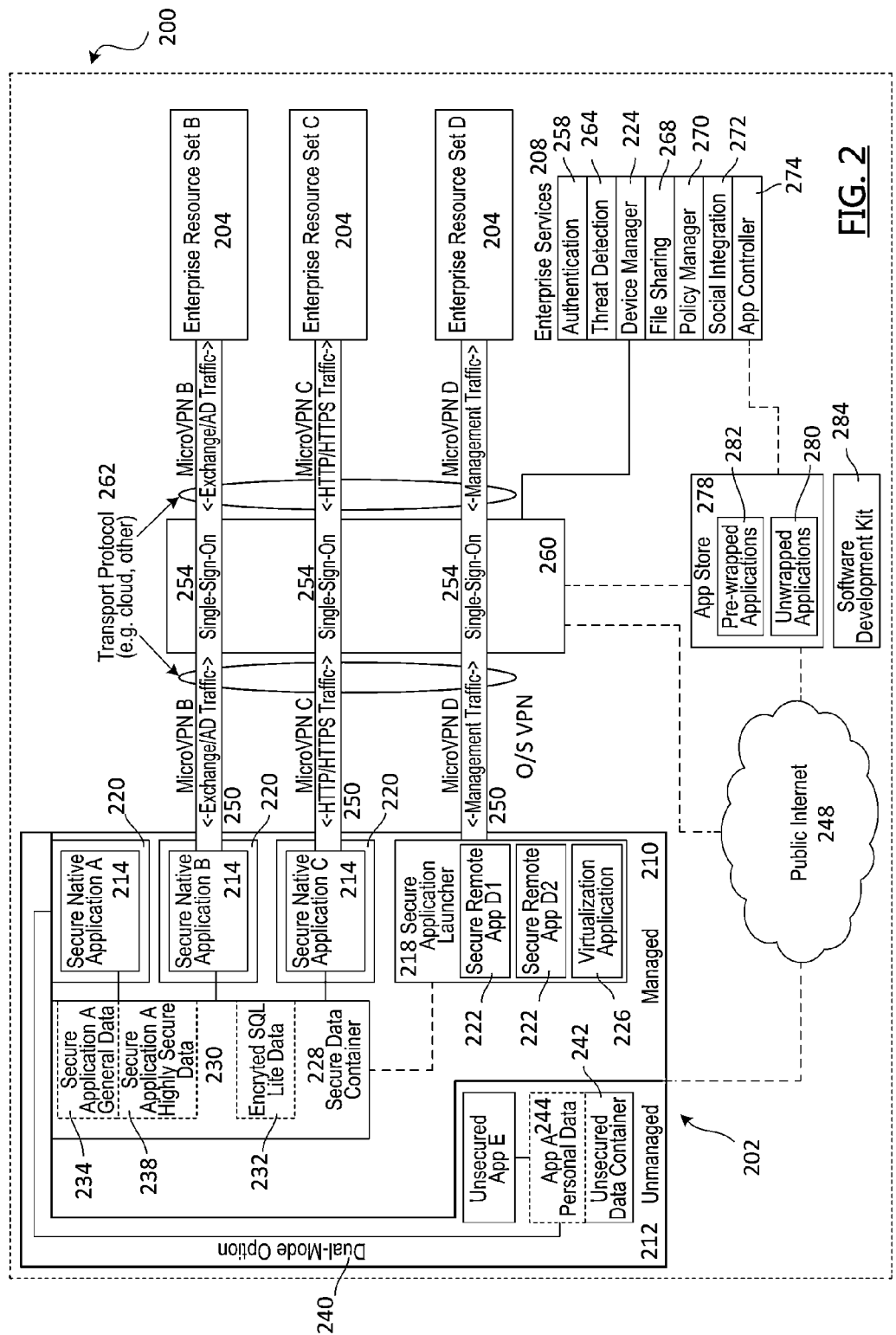
FIG. 2 depicts an illustrative enterprise mobility management system that may be used in implementing one or more aspects of the disclosure in accordance with one or more illustrative aspects discussed herein.

FIG. 2 illustrates an example enterprise mobility technical architecture 200 for use in a BYOD environment. The architecture enables a user of mobile device 202, which may be a computing device such as computing device 100, to both access enterprise or personal resources from a mobile device 202 and use the mobile device 202 for personal use. The user may access such enterprise resources 204 or enterprise services 208 using a mobile device 202 that is purchased by the user or a mobile device 202 that is provided by the enterprise to user. The user may utilize the mobile device 202 for business use only or for business and personal use. The mobile device may run an iOS operating system, and Android operating system, or the like. The enterprise may choose to implement policies to manage the mobile device 202. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 202 that is managed through the application of mobile device management policies may be referred to as an enrolled device.

In some embodiments, the operating system of the mobile device may be separated into a managed partition 210 and an unmanaged partition 212. The managed partition 210 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 214, secure remote applications 222 executed by a secure application launcher 218, virtualization applications 226 executed by a secure application launcher 218, and the like. The secure native applications 214 may be wrapped by a secure application wrapper 220. The secure application wrapper 220 may include integrated policies that are executed on the mobile device 202 when the secure native application is executed on the device. The secure application wrapper 220 may include meta-data that points the secure native application 214 running on the mobile device 202 to the resources hosted at the enterprise that the secure native application 214 may require to complete the task requested upon execution of the secure native application 214. The secure remote applications 222 executed by a secure application launcher 218 may be executed within the secure application launcher application 218. The virtualization applications 226 executed by a secure application launcher 218 may utilize resources on the mobile device 202, at the enterprise resources 204, and the like. The resources used on the mobile device 202 by the virtualization applications 226 executed by a secure application launcher 218 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 204, and the like. The resources used at the enterprise resources 204 by the virtualization applications 226 executed by a secure application launcher 218 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 228 in the managed partition 210 of the mobile device. The data secured in the secure data container may be accessed by the secure wrapped applications 214, applications executed by a secure application launcher 222, virtualization applications 226 executed by a secure application launcher 222, and the like. The data stored in the secure data container 228 may include files, databases, and the like. The data stored in the secure data container 228 may include data restricted to a specific secure application 230, shared among secure applications 232, and the like. Data restricted to a secure application may include secure general data 234 and highly secure data 238. Secure general data may use a strong form of encryption such as Advanced Encryption Standard (AES) 128-bit encryption or the like, while highly secure data 238 may use a very strong form of encryption such as AES 256-bit encryption. Data stored in the secure data container 228 may be deleted from the device upon receipt of a command from the device manager 224. The secure applications may have a dual-mode option 240. The dual mode option 240 may present the user with an option to operate the secured application in an unsecured or unmanaged mode. In an unsecured or unmanaged mode, the secure applications may access data stored in an unsecured data container 242 on the unmanaged partition 212 of the mobile device 202. The data stored in an unsecured data container may be personal data 244. The data stored in an unsecured data container 242 may also be accessed by unsecured applications that are running on the unmanaged partition 212 of the mobile device 202. The data stored in an unsecured data container 242 may remain on the mobile device 202 when the data stored in the secure data container 228 is deleted from the mobile device 202. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 204 and enterprise services 208 at an enterprise, to the public Internet 248, and the like. The mobile device may connect to enterprise resources 204 and enterprise services 208 through virtual private network connections. The virtual private network connections, also referred to as microVPN or application-specific VPN, may be specific to particular applications 250, particular devices, particular secured areas on the mobile device, and the like 252. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 254. The single-sign-on processes may allow a user to provide a single set of authentication credentials, which are then verified by an authentication service 258. The authentication service 258 may then grant to the user access to multiple enterprise resources 204, without requiring the user to provide authentication credentials to each individual enterprise resource 204.

The virtual private network connections may be established and managed by an access gateway 260. The access gateway 260 may include performance enhancement features that manage, accelerate, and improve the delivery of enterprise resources 204 to the mobile device 202. The access gateway may also re-route traffic from the mobile device 202 to the public Internet 248, enabling the mobile device 202 to access publicly available and unsecured applications that run on the public Internet 248. The mobile device may connect to the access gateway via a transport network 262. The transport network 262 may be a wired network, wireless network, cloud network, local area network, metropolitan area network, wide area network, public network, private network, and the like.

The enterprise resources 204 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 204 may be premise-based resources, cloud based resources, and the like. The enterprise resources 204 may be accessed by the mobile device 202 directly or through the access gateway 260. The enterprise resources 204 may be accessed by the mobile device 202 via a transport network 262. The transport network 262 may be a wired network, wireless network, cloud network, local area network, metropolitan area network, wide area network, public network, private network, and the like.

The enterprise services 208 may include authentication services 258, threat detection services 264, device manager services 224, file sharing services 268, policy manager services 270, social integration services 272, application controller services 274, and the like. Authentication services 258 may include user authentication services, device authentication services, application authentication services, data authentication services and the like. Authentication services 258 may use certificates. The certificates may be stored on the mobile device 202, by the enterprise resources 204, and the like. The certificates stored on the mobile device 202 may be stored in an encrypted location on the mobile device, the certificate may be temporarily stored on the mobile device 202 for use at the time of authentication, and the like. Threat detection services 264 may include intrusion detection services, unauthorized access attempt detection services, and the like. Unauthorized access attempt detection services may include unauthorized attempts to access devices, applications, data, and the like. Device management services 224 may include configuration, provisioning, security, support, monitoring, reporting, and decommissioning services. File sharing services 268 may include file management services, file storage services, file collaboration services, and the like. Policy manager services 270 may include device policy manager services, application policy manager services, data policy manager services, and the like. Social integration services 272 may include contact integration services, collaboration services, integration with social networks such as Facebook, Twitter, and LinkedIn, and the like. Application controller services 274 may include management services, provisioning services, deployment services, assignment services, revocation services, wrapping services, and the like.

The enterprise mobility technical architecture 200 may include an application store 278. The application store 278 may include unwrapped applications 280, pre-wrapped applications 282, and the like. Applications may be populated in the application store 278 from the application controller 274. The application store 278 may be accessed by the mobile device 202 through the access gateway 260, through the public Internet 248, or the like. The application store may be provided with an intuitive and easy to use User Interface.

A software development kit 284 may provide a user the capability to secure applications selected by the user by wrapping the application as described previously in this description. An application that has been wrapped using the software development kit 284 may then be made available to the mobile device 202 by populating it in the application store 278 using the application controller 274.

The enterprise mobility technical architecture 200 may include a management and analytics capability 288. The management and analytics capability 288 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Having discussed several examples of the computing system architecture that may be used in providing and/or implementing various aspects of the disclosure, a number of embodiments will now be discussed in greater detail. In particular, and as introduced above, some aspects of the disclosure generally relate to providing remote assistance for user computing devices in a managed environment while maintaining separation between personal data and managed spaces. Some aspects of the disclosure relate to various policies that may limit and/or control the data, applications, and/or features that may be accessed by an administrator providing remote assistance. In the description below, various examples illustrating how policy managed remote assistance may be provided in accordance with one or more embodiments will be discussed.

In a bring your own device (BYOD) environment, companies may desire to provide remote support and assistance to users accessing enterprise resources through managed applications. Users may encounter a variety of technical problems when utilizing managed applications, and these problems may be more readily solved through assistance from administrators and other support professionals. One support technique that may be used is remote assistance whereby an administrator takes control of the user's device remotely in order to diagnose and correct problems that a user may encounter.

As discussed above, users may have personal data and applications on their device and it may be unnecessary for the administrator to access this personal data. Further, the user may consider some of the personal data to be sensitive or private and may desire that it not be exposed to a remote administrator. If the administrator is granted unrestricted access to remotely control the device, the administrator may be provided with access to data that the user does not want exposed. However, in some instances the administrator may require full access to certain applications and features of the device in order to provide effective remote assistance.

According to some aspects disclosed herein, a system for remote assistance and control of user devices subject to one or more remote assistance policies may be provided. In some embodiments, an administrator may request remote control of a managed user device. The administrator may be provided with access to a managed application launcher provided by the user device. The managed application launcher may be modified by the user device to remove managed applications or otherwise prevent access to applications that have a policy indicating that remote assistance is not allowed. The administrator may open a managed application included in the launcher and remotely control that application, in accordance with the remote assistance policies. In other embodiments, a user of the managed user device may initiate a request for remote assistance from within a managed application and/or the managed application launcher. An administrator or other support professional may respond and take control of the user device. The administrator's control of the user device and access to other applications on the user device may be limited based on the remote assistance policies.

Figure 3:
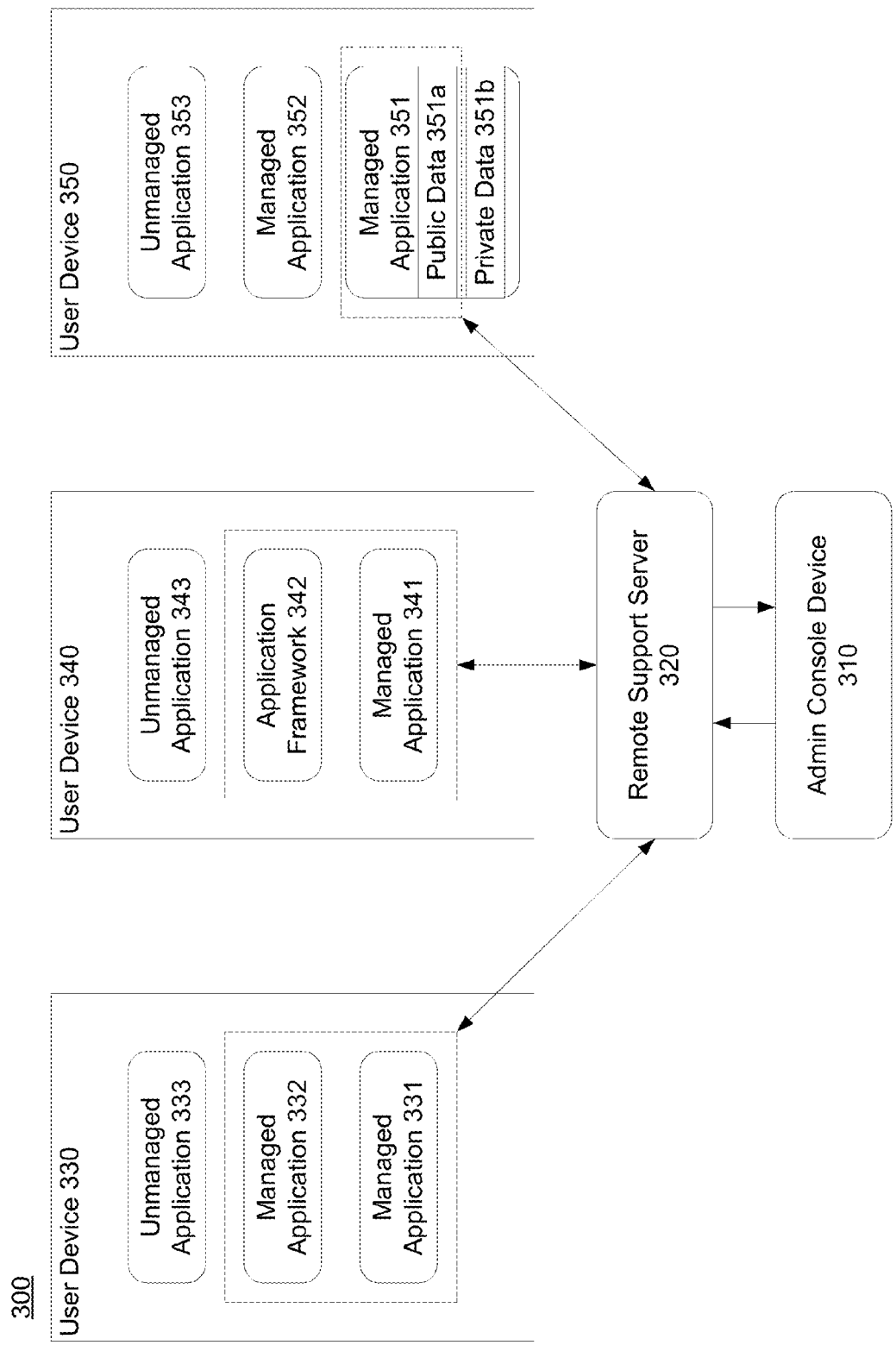
FIG. 3 depicts an example system architecture in which remote assistance may be provided in accordance with one or more illustrative aspects discussed herein.

FIG. 3 illustrates an example system 300 for providing remote assistance to one or more computing devices in a managed services environment. System 300 may include an admin console device 310, a remote support server 320, and user devices 330, 340 and 350. Each of the illustrated devices may be implemented by one or more computing devices, such as computing device 100. User devices 330, 340, and 350 may each be a mobile device enrolled in a managed services environment, similarly to mobile device 202 of FIG. 2. Each device may communicate with any other device through one or more networks, such as a local area network (LAN) and/or the internet. Remote support server 320 and admin console device 310 may be implemented as different computing devices, or remote support server 320 and admin console device 310 may be implemented by the same device(s).

Through system 300, and according to some aspects described herein, an administrator (or other support professional) operating admin console device 310 may remotely access and control user device 330, 340, and/or 350. The admin console device 310 may communicate with and/or utilize remote support server 320 to initiate a remote assistance connection, send remote commands, and receive screen updates from one or more of user devices 330, 340, and 350. In some embodiments, remote support server 320 may provide a web-based user interface to admin console device 310 in order to facilitate management and remote assistance for one or more user devices. The web-based user interface may provide a list of available user device for remote assistance, access, and control. The web-based user interface may provide a list or other indication of available applications on a selected user device for remote assistance. Remote support server 320 may initiate a remote connection with a selected user device, provide the administrator with a view of the user device screen, and send user input commands from the administrator to the user device. Admin console device 310 may send received user input commands to remote support server 320 and may receive screen update content of a remotely accessed user device from remote support server 320.

The administrator may remotely access and control each of user device 330, 340 and 350, as illustrated in FIG. 3. Remote access by the administrator may be controlled and/or limited by one or more remote assistance policies, such as one or more remote assistance policies in a remote assistance policy set. Remote assistance policies, such as access policies, may specify whether an application supports remote assistance connections. Other remote assistance policies, such as user input policies and/or screen content policies, may specify what actions or features a support administrator can access, what data may be accessed by the support administrator, and/or what portions of a user interface should be sent to the administrator, for example. Remote assistance policies may be scoped on an individual device level, groups of devices, and/or system wide. Remote assistance policies may be configured by a system administrator, by a user of the user device, and/or preconfigured in the applications or devices.

For example, a support professional using admin console device 310 may seek to provide remote assistance for user device 330. User device 330 may have any number of applications installed thereon and may possess a collection of text, image, audio, video, application, and other data. However, in the example illustrated in FIG. 3 user device 330 may have three example applications installed thereon, managed application 331, managed application 332, and unmanaged application 333. User device 330 may have an access policy in a remote assistance policy set specifying that remote assistance should be limited to managed applications 331 and 332. An administrator may access user device 330 to provide remote assistance, but the administrator may be limited to accessing those applications specified in the remote assistance policy set. That is, the administrator may be allowed to remotely access and control managed applications 331 and 332 on user device 330, but not unmanaged application 333. In some embodiments, user device 330 may respond to a request for remote access from a support professional with an indication of which applications are available for remote assistance. Remote support server 320 may indicate the status of available applications to the support professional and receive a selection of an application to begin remote access and control. For example, an administrator may operate admin console device 310 to select managed application 331 as displayed in a support interface provided by remote support server 320. Remote support server 320 may initiate a remote assistance connection with user device 330, and user device 330 may begin executing managed application 331. User device 330 may provide screen content to remote support server 320, and remote support server 320 may provide this screen content to admin console device 310. Admin console device 310 may communicate user input received from a support professional to remote support server 320 for communication to user device 330. User device 330 may process the user input, determine whether it complies with one or more remote assistance policies of the remote policy set, and provide updated screen content to remote support server 320.

Remote user input from the administrator or support professional may be processed by the remotely accessed user device according to one or more remote assistance policies. For example, a user input policy may specify that the remote assistance should be limited to only managed applications 331 and 332. If user input is received from the administrator requesting to run and/or view unmanaged application 333, user device 330 may ignore the input and/or provide an error response. The remote assistance policies may have other restraints on user input. For example, a user input policy may specify that the administrator is not allowed to delete any items. As another example, a user input policy may prevent the administrator from sending emails and/or other content. The remote user input may be generated by any suitable user input devices associated with the remote user and/or a remote user device. For example, the remote user input may be generated by user input devices such as a keyboard, a mouse, bluetooth peripherals, Universal Serial Bus (USB) input devices, and the like. In some embodiments, the remote user may provide user input by way of an input device type that is not available at the user device. For example, some user devices may include tablet computers that lack a mouse and/or physical keyboard, instead providing a touchscreen and a virtual keyboard. The remote user may utilize a mouse and physical keyboard to control a pointer or input text during the remote assistance session, and the system may convert the remote user's user input to the corresponding actions on the user device.

In some embodiments, the system may recognize one or more gestures associated with the remote assistance session. For example, the system may recognize a gesture indicating that a remote assistance session be paused. As other examples, the system may recognize gestures associated with any of: temporarily obscuring portions of the screen, including the whole screen; pausing screen updates; resuming screen updates and/or the remote assistance session; ending the remote assistance sessions; switching between applications on the user device; switching between multiple remote assistance sessions; switching between the remote assistance session and a local environment of the remote user device; inviting additional remote users to join the remote assistance session; and the like. The remote user device, the local user device, and/or a remote assistance server may recognize the gestures using any suitable input devices, such as a touchscreen, mouse, keyboard, camera, proximity sensor, bluetooth peripheral, and/or any suitable device for capturing and/or processing local or remote user gestures. Additionally and/or alternatively, any of the above functions may be implemented using a button or menu option.

Screen content reflecting a user interface of a remotely accessed user device may also be processed by the user device according to one or more remote assistance policies of the remote assistance policy set. For example, a screen content policy may specify that sensitive data, such as usernames and passwords, be removed from the screen content before it is provided to the remote administrator. A screen content policy may cause a content portion of the screen to be blurred and/or hidden. For example, the policy may block a region of the screen used by a particular application to present personal data or content, such as where emails are displayed in an email application. As another example, a screen content policy may include a content rule that causes portions of the user interface associated with an application to be obscured if content included therein matches one or more criteria, such as a rule that matches phone numbers and/or social security numbers.

As a result of enforcing the remote assistance policy set, an administrator may be able to initiate remote access and control of managed applications on user devices without user personal data and other applications being exposed unnecessarily to the administrator. Thus, the administrator may be able to take control of a device in a limited manner within a secured and/or approved workspace on the user device, while the user's personal data and applications can remain private.

As another example, an administrator may select user device 340 for remote assistance. User device 340 may have one or more managed applications, such as managed application 341, a managed application framework 342, and one or more unmanaged applications, such as unmanaged application 343. Managed application framework 342 may be operable to provide a managed application launcher on a user interface of user device 340. The managed application launcher may represent a separate and secured homescreen for user device 340. The managed application launcher may include one or more managed applications installed on user device 340 while omitting unmanaged applications installed on user device 340. The managed application launcher is discussed further below in regard to FIGS. 5A and 5B.

In some embodiments, the administrator may be presented with a managed application launcher generated by user device 340 in response to initiating remote assistance. When the administrator initiates a request for remote control of user device 340, user device 340 may generate and/or execute the managed application launcher and provide the administrator with access to one or more managed applications, such as managed application 341, via remote support server 320. The managed application launcher may be limited to managed applications, and may be limited to only those applications where a remote assistance policy indicates that remote assistance is supported. User device 340 may execute the managed application launcher, display output as appropriate, and send corresponding screen content to remote support server 320. The administrator may view the screen content including the executing managed application launcher and select a managed application to launch for remote assistance and control. In some embodiments, the managed application launcher may include managed applications installed on the device regardless of the remote assistance policies. If the administrator selects a managed application to launch where an access policy indicates that remote assistance is not available, user device 340 may provide an error and/or ignore the request. In other embodiments, the managed application launcher may be generated based on the remote assistance policies and contain only those managed applications with remote access available, according to access policies. The administrator may be provided the capability to return to the managed application launcher after and/or during remote access of a selected application. For example, the web-based interface provided by remote support server 320 may include a HOME or BACK button that commands a remotely accessed user device to return to the managed application launcher (or other launcher based on remote assistance policies).

As still another example, a user of user device 350 may request remote assistance from an administrator and/or support professional. User device 350 may include managed application 351, managed application 352, and unmanaged application 353. The user may be operating managed application 351 and desire remote assistance. The user may operate a control and/or other feature provided by managed application 351 and/or user device 350 to request remote assistance. User device 350 may communicate the request for remote assistance to remote support server 320. An administrator using admin console device 310 may respond to the request and initiate remote assistance via remote support server 320. User device 350 may send screen content to remote support server 320, and remote support server 320 may send user input received from the admin console device 310 to user device 350. User device 350 may process and respond to the user input as appropriate, based on the one or more remote assistance policies.

In some embodiments, the administrator's remote access may be limited to the application in which the user requested remote assistance. For example, the administrator may be prevented from accessing managed application 352 during a remote assistance session initiated through managed application 351. Additionally and/or alternatively, a remote assistance policy may specify that managed application 352 is not available for remote assistance. Managed application 351 may contain public data 351*a* and private data 351*b*. Private data 351*b* may be, for example, information that the user does not want to expose to the administrator or support professional providing remote assistance. One or more remote assistance policies may specify that private data 351*b* should not be transmitted to remote support server 320 and/or admin console device 310.

The one or more remote assistance policies discussed herein may limit access by an administrator and/or support professional to personal information and/or applications stored on a user device during a remote assistance session. In some embodiments, the user device, remote support server 320, and/or admin console device 310 may provide override and/or bypass features whereby the administrator may request access to data and/or applications blocked by the one or more remote assistance policies. For example, the administrator could indicate a region with content that has been modified as the result of a remote assistance policy, such as where a username has been obscured. The user device could generate a notification and/or other request and present it to a local user of the user device asking whether the user will grant access to the content, thereby overriding the policy. The user device may present and/or manage the notification so that only the local user can respond. That is, the remotely accessing administrator may be prevented from responding to the notification and granting himself access beyond the remote assistance policies. As another example, the administrator may request access to a managed application where a remote assistance policy indicates that remote assistance should be denied and/or where a remote assistance policy indicates that the local user must approve remote access requests. In some embodiments, the administrator may be able to override one or more remote assistance policies by providing a password and/or other credentials establishing that the administrator has authority to override the policy.

In some embodiments, the administrator may be able to request full access to the user device. That is, the administrator may request unencumbered control of the user device and a suspension of remote assistance policies that would prevent the administrator from accessing one or more features of the user device. The user device may generate a prompt informing the user of the request for full access and the user may decide whether to grant such access.

Figure 4:
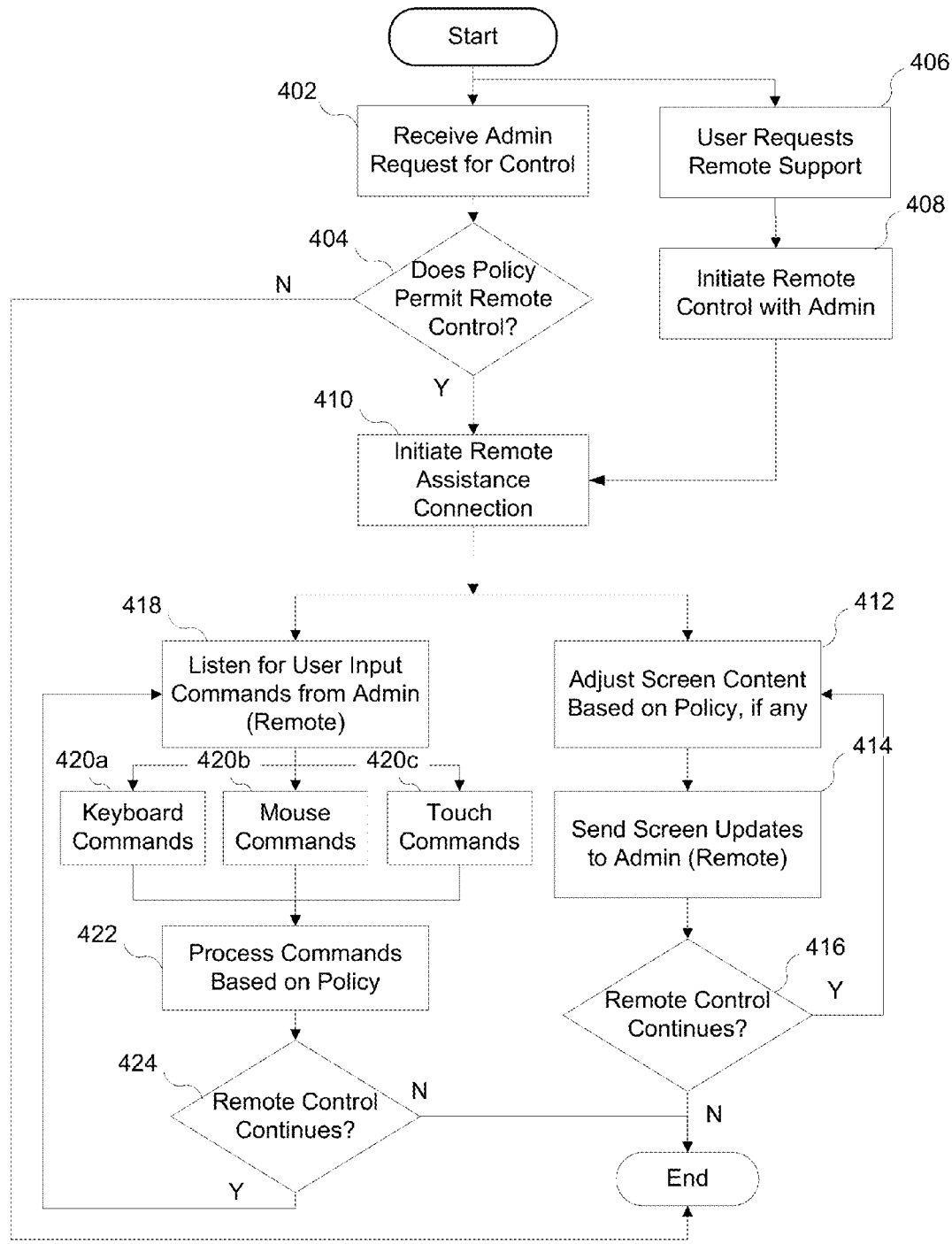
FIG. 4 depicts a flow chart illustrating a process for providing remote assistance to users on a computing device in accordance with one or more illustrative aspects discussed herein

Having discussed an illustrative system architecture for providing remote assistance according to one or more aspects, discussion will now turn to a method for providing remote assistance for user devices in a managed application environment as illustrated in FIG. 4.

FIG. 4 depicts a method for providing remote assistance to user devices in a managed application environment based on one or more remote assistance policies in accordance with one or more illustrative aspects discussed herein. In one or more embodiments, the method illustrated in FIG. 4 and/or one or more steps thereof may be performed by a computing device (e.g., generic computing device 100). Additionally or alternatively, the method illustrated in FIG. 4 and/or one or more steps thereof may, in some instances, be performed by a user device, a remote support server, and/or an admin console device. In some embodiments, the method illustrated in FIG. 4 and/or one or more steps thereof may be performed by a mobile device operating in a managed application environment. The mobile device may execute one or more applications, generate a user interface presented output from the applications, and accept user input from a range of input types, including touch input, gestures, mouse input, keyboard input, microphone input, camera input, and the like. In other embodiments, the method illustrated in FIG. 4 and/or one or more steps thereof may be embodied in computer-executable instructions that are stored in a computer-readable medium, such as a non-transitory computer-readable memory.

At the beginning of the method illustrated in FIG. 4, a computing device enrolled in a managed application environment, such as mobile device 202 of FIG. 2 (also referred to as a managed device), may either receive a request for remote control from an administrator in step 402 or receive a request for remote support from a local user in step 406.

In step 402, the managed device may receive a request for remote control from an administrator and/or other support professional. The administrator may request remote control through a remote support server, such as by using a web-based interface provided by the remote support server. In some embodiments, the administrator may choose to request remote control of the managed device through access to a managed application launcher provided by the computing device. In other embodiments, the administrator may request remote control of a particular managed application installed on the user device. In some embodiments, the administrator can request control of the managed device and be granted access even in the absence of a local user on the managed device, subject to the policy restrictions discussed further below.

At step 404, the managed device may determine whether one or more remote assistance policies of a remote assistance policy set permit the requested level of remote control. Remote assistance policies may specify which applications are available for remote assistance. Remote assistance policies may specify whether the administrator may access a remote assistance launcher or if the administrator is limited to launching specific applications. The remote assistance policies may specify what actions or features a support administrator can access, what data may be accessed by the support administrator, and/or what portions of a user interface should be sent to the administrator. Remote assistance policies may be scoped on an individual device level, groups of devices, and/or system wide. Remote assistance policies may be configured by a system administrator, by a user of the user device, and/or preconfigured in the applications or devices. In step 404, the computing device may determine whether the requested level of remote control is permitted. For example, the computing device may determine whether the administrator is allowed to access a launcher of remote assistance enabled applications, when so requested by the administrator.

As another example of the decisions made in step 404, the managed device may determine whether a local user of the computing device grants the request for remote control. This may be done where a remote assistance policy specifies that the user should be prompted prior to granting remote control to an administrator. In other embodiments, the user is not prompted to approve a request for remote control and the request is handled according to other policies. In some embodiments, the user may be prompted whether to allow the remote control when it would violate one or more of the remote assistance policies, for example as part of a policy override procedure. For example, if the administrator requests remote control of a managed email application, and an access policy specifies that the managed email application should not be available for remote assistance, the computing device may prompt the user to ask whether the remote control should be granted despite the access policy, thereby overriding the access policy.

If the requested remote control is permitted by the remote assistance policies, the method may proceed to step 410 where the managed device initiates a remote assistance connection. If the requested remote control is not permitted by and/or violates a remote assistance policy, the method may terminate until another remote control request is received. Additionally and/or alternatively, a local user of the managed device may be notified of the failed request for remote control and provided an opportunity to modify the one or more remote assistance policies.

In other embodiments, the method illustrated in FIG. 4 may begin at step 406 when a user of the managed device requests remote support. A managed application installed on the managed device may provide a remote assistance control on a user interface associated with the managed application. This remote assistance control may be operable to initiate a request for remote assistance. The managed device may communicate this request to a remote support server over a network, such as remote support server 320 of FIG. 3. In some embodiments, the managed application may prompt a user to provide more information about a problem or issue associated with the request for remote support.

In some embodiments, the user's request for remote support may be evaluated against one or more remote assistance policies. For example, an access policy may indicate that remote assistance is not available for the particular managed application. In such a case, the managed device may generate a notification informing the user that remote assistance is not available and the method may terminate.

At step 408, an administrator and/or other support professional may respond to the request for remote support and the managed device may initiate a remote assistance connection in step 410.

In step 410, the managed device may initiate a remote assistance connection with a remote support server based on either receiving the request for remote control from the administrator in step 402 or the local user requesting support in step 406. The managed device may initiate a remote assistance session with the remote support server according to a remote control protocol. For example, the remote assistance session may be initiated using a remote presentation protocol or other program to send data to the remote support server to present display output generated by an application executing on the managed device.

The managed device may begin executing the managed application launcher or particular managed application as requested by the administrator. In some embodiments, the managed device may dynamically generate the content of the managed application launcher based on the one or more remote assistance policies in the remote assistance policy set. For example, the managed device may include managed applications that support remote assistance in the managed application launcher while omitting managed applications that do not support remote assistance.

In some embodiments, the managed device may provide remote control by modifying one or more input/output interfaces provided by the managed device and/or applications. The interfaces may modified such that input interfaces receive user input sent by the administrator and screen output from output interfaces is sent to the administrator through the remote support server. The modifications to the interfaces may be made in accordance with the one or more remote assistance policies, as will be discussed below in regard to steps 412 and 418.

Figure 6A:
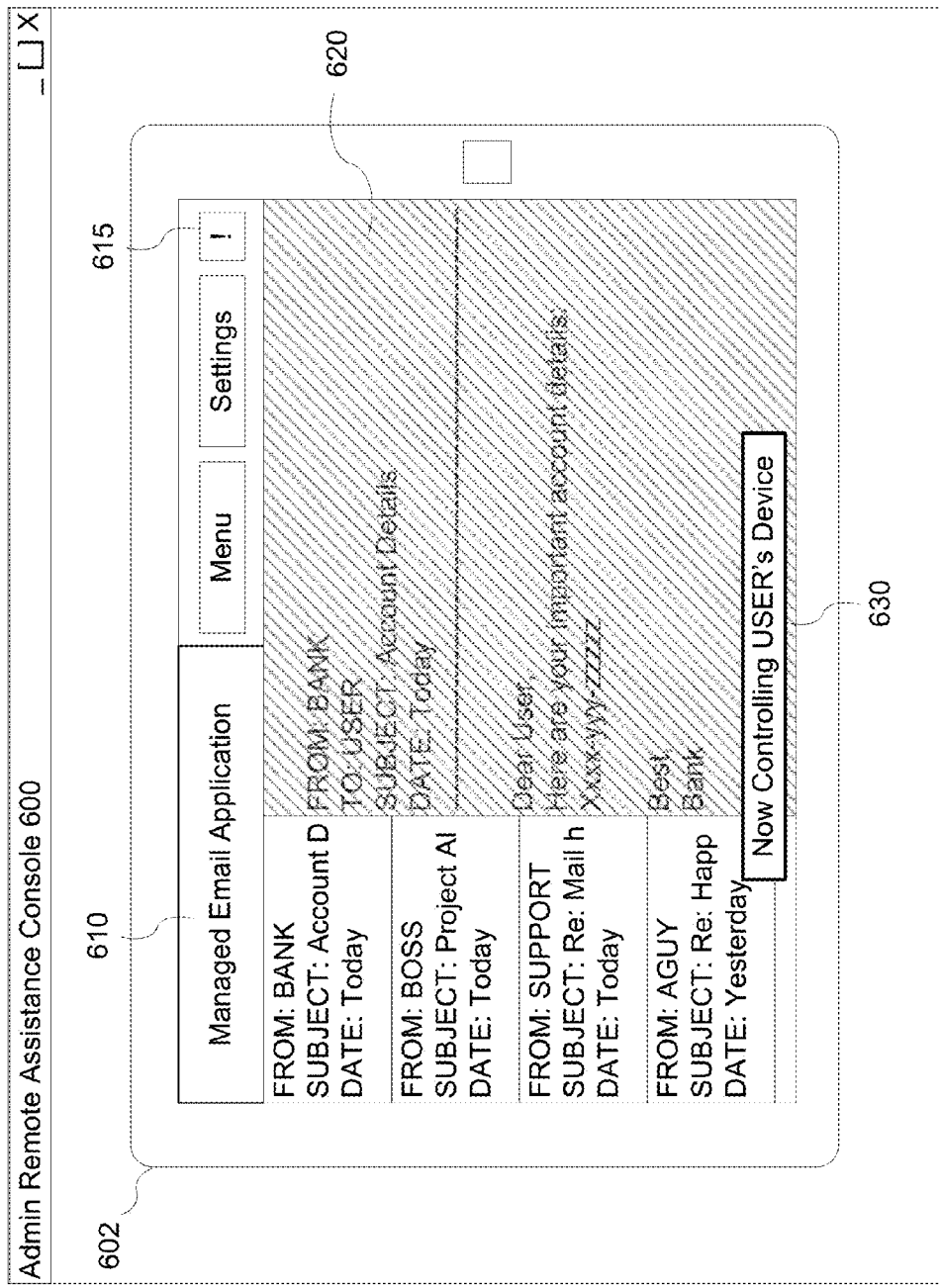
FIGS. 6A-B depict an example of a user interface used to provide remote assistance to a computing device in accordance with one or more illustrative aspects discussed herein.
Figure 6B:
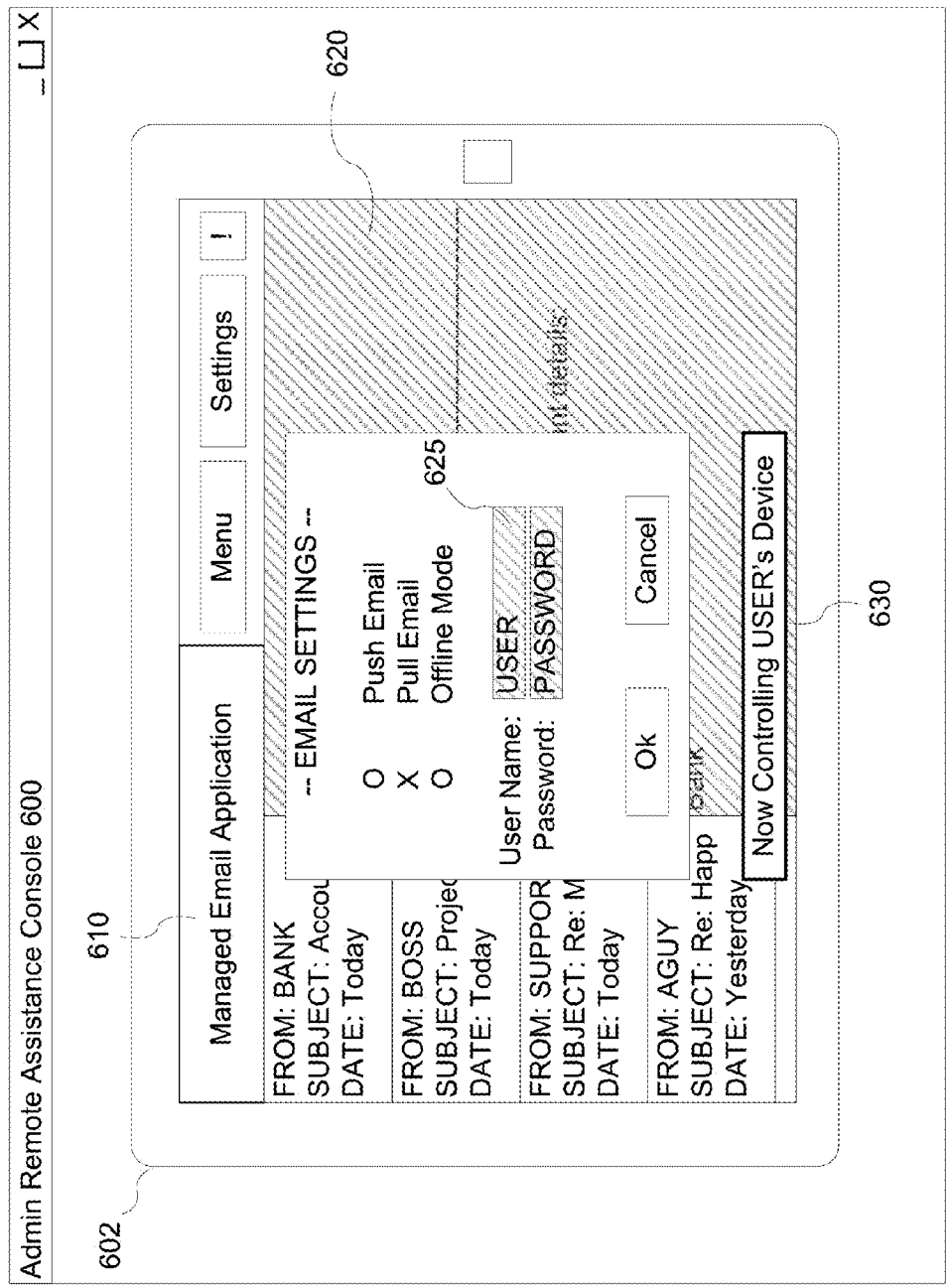

In step 412, the managed device prepares to provide the remote administrator with screen content from the managed device by adjusting the screen content based on one or more of the remote assistance policies, such as one or more screen content policies. In some embodiments, output interfaces associated with the managed device and/or application may be modified to adjust the screen content based on the remote assistance policies. The screen content policies may indicate that certain portions of a user interface generated according to the particular managed application being remotely accessed should be hidden and/or obscured. For example, a remote assistance policy may specify that a content region of the application be hidden while a settings and/or configuration page remain visible. As another example, a remote assistance policy may cause certain sensitive information to be hidden, such as usernames, passwords, addresses, prices, account balances, account numbers, confidential information, privileged information, and/or any other information a user may not want to expose to an administrator providing remote assistance. A remote assistance policy may include a content rule, such that the screen content is analyzed to determine whether it contains any content matching the content rule. Any matching content could be blocked. For example, the content rule could include the known format of a social security number and could be operable to cause any numbers matching that format to be hidden in screen content that is sent to the remote administrator. A further example of how a user interface generated by a managed application may be modified is illustrated in FIGS. 6A-6B, discussed further below.

In step 414, the managed device may send the modified screen content to the administrator through the remote support server. The modified screen content may be presented to the administrator through a web based interface and/or other user interface provided by the remote support server. Through the transmittal of the modified screen content, the administrator may be able to view the output of the managed application as presented by the managed device.

In step 416, processing returns to send updated screen content in step 412 if remote control continues. Remote control may continue until the administrator, local user, and/or remote support server terminate the remote assistance session. If remote control is terminated, processing according to the method illustrated in FIG. 4 may end.

In step 418, in parallel with steps 412-416, the managed device may listen for user input commands from the remote administrator. The administrator may issue user input comprising any sort of input type, including touch input, gestures, mouse input, keyboard input, microphone input, camera input, and the like. The user input generated by the administrator may be provided the remote support server which may send the user input as commands to the managed device. The managed device may process the user input such as keyboard commands in step 420*a*, mouse commands in step 420*b*, and/or touch commands in step 420*c*, for example. The managed device may also receive and/or process other input received from the remote administrator, such as audio input, video input, etc.

In some embodiments, a local user may be prevented from providing user input to the device during a remote assistance session. The managed device may limit its processing of user input to the input received from the remote administrator. In other embodiments, the managed device may continue to accept local user input in addition to the user input from the remote administrator. In some embodiments, input from a local user may be given priority and/or preclude user input from an administrator providing remote assistance.

In step 422, the managed device may process the user input commands received from the administrator providing remote assistance. The commands may be processed based on one or more remote assistance policies of the remote assistance policy set governing remote assistance on the managed device, managed application environment, and/or managed application. User input policies may specify limitations on what commands the remote administrator may issue. A user input policy may specify what actions or features a support administrator can access, what data may be accessed by the support administrator, and/or what portions of a user interface should be sent to the administrator. For example, a user input policy may specify that the administrator cannot delete emails in an email application. As another example, a user input policy may specify that the administrator cannot access a main homescreen of the device and should be taken to a managed application launcher upon issuing a HOME command. The remote assistance policies may govern the actions available to the administrator within the managed application itself, moving between managed applications, and/or otherwise interacting with the managed device.

In step 424, processing returns to continue listening for user input from the remote administrator in step 418 if remote control continues. Remote control may continue until the administrator, local user, and/or remote support server terminate the remote assistance session. If remote control is terminated, processing according to the method illustrated in FIG. 4 may end.

Having discussed a method for providing remote assistance to user devices in a managed application environment based on one or more remote assistance policies in accordance with one or more illustrative aspects discussed herein, discussion will now turn to various user interfaces for providing remote assistance managed by one or more remote assistance policies according to one or more aspects of the disclosure.

Figure 5A:
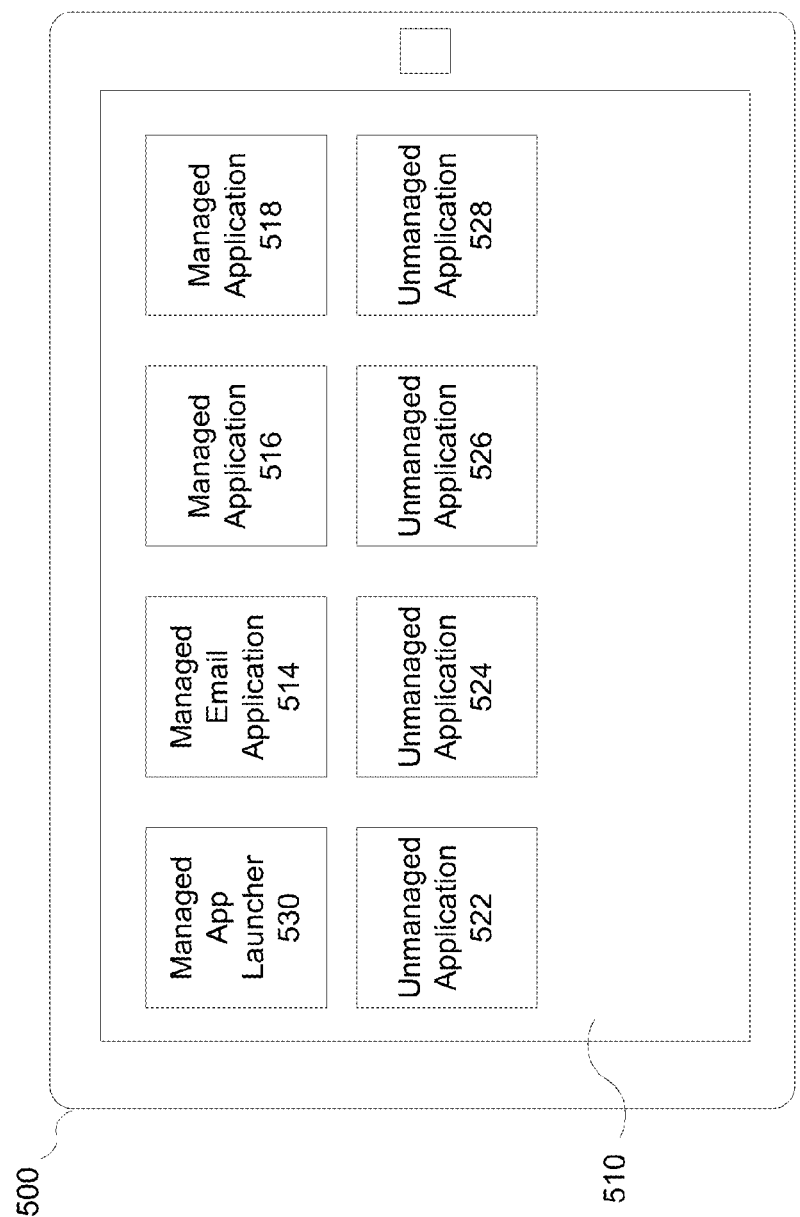
FIGS. 5A-5C depict example user interfaces of a user device in accordance with one of more aspects discussed herein.

FIG. 5A depicts an example of a user interface 510 provided by a user device 500. User device 500 may participate in a BYOD environment and utilize managed applications to access enterprise resources and services, similarly to mobile device 202 of FIG. 2. User device 500 may be, in some embodiments, a mobile phone, a smartphone, a tablet computer, and the like. User device 500 may include a touch screen adapted to receive touch input and/or gestures from a user. User device 500 may accept user input from a range of input types, including touch input, gestures, mouse input, keyboard input, microphone input, camera input, and the like. User device 500 may execute one or more applications, receive and process user input to the application and/or user device 500, and provide updates to a user interface associated with the application and/or user device 500.

User interface 510 may represent a homescreen of user device 500. The homescreen may present shortcuts to one or more applications installed on user device 500, allowing a user to select an application for executing and/or viewing on user device 500. As illustrated in FIG. 5A, user interface 510 may include shortcuts to a managed app launcher 530, managed applications 514, 516, and 518, and unmanaged applications 522, 524, 526, and 528. Each of the shortcuts presented on user interface 510 may be operable to launch the associated application. For example, the user may tap or otherwise select a shortcut to launch the application associated with that shortcut. For example, the user may tap on the managed app launcher 530 and user device 500 may replace and/or update user interface 510 to updated user interface 511 as shown in FIG. 5B.

Figure 5B:
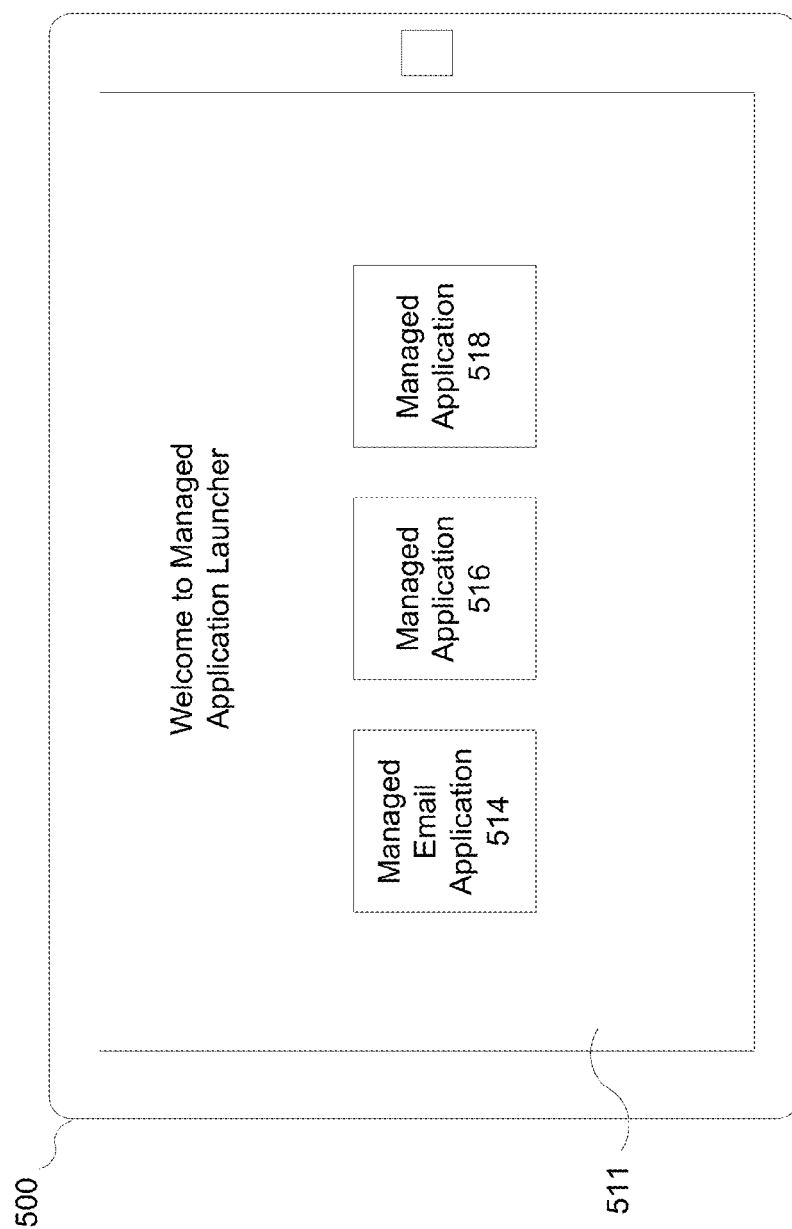

FIG. 5B illustrates an updated user interface 511 presented by user device 500. User interface 511 may correspond to a screen associated with managed app launcher 530. Managed app launcher 530 may be an application that provides access to other applications, such as managed applications 514, 516, and 518. In some embodiments, managed app launcher 530 may be implemented through homescreen and/or app launcher features made available by an operating system of user device 500. In some embodiments, the managed applications included in managed app launcher 530 may be unavailable on the main homescreen of the device (such as that illustrated in FIG. 5A). A local user of user device 500 may use managed app launcher to easily identify and launch managed applications on user device 500.

According to some aspects discussed herein, managed app launcher 530 may also be used to provide an administrator and/or other support professional remote access to one or more managed applications for providing remote assistance. The remote administrator may request that remote assistance and control of user device 500 be initiated. Based on one or more remote assistance policies associated with user device 500, the administrator may be limited to remotely accessing those managed applications included in managed application launcher. The administrator may be prevented from accessing other applications stored on user device 500, such as unmanaged applications 522, 524, 526, and/or 528. Thus, the managed app launcher 530 can be used to provide the administrator with remote access and control of managed applications while preventing the administrator from accessing personal data and/or applications.

User interface 511, associated with managed app launcher 530, may be generated based on managed applications installed on user device 500. Further, in some embodiments user interface 511 may be generated based on one or more remote access policies specifying whether an application is available for remote assistance. Where an administrator is being provided with remote access to managed app launcher 530, user device 500 may omit from inclusion in managed app launcher 530 any applications where a remote assistance policy indicates that the application should not be made available. Thus, even if a user has a particular managed application available, that managed application may be hidden from the administrator if a remote assistance policy dictates.

Figure 5C:
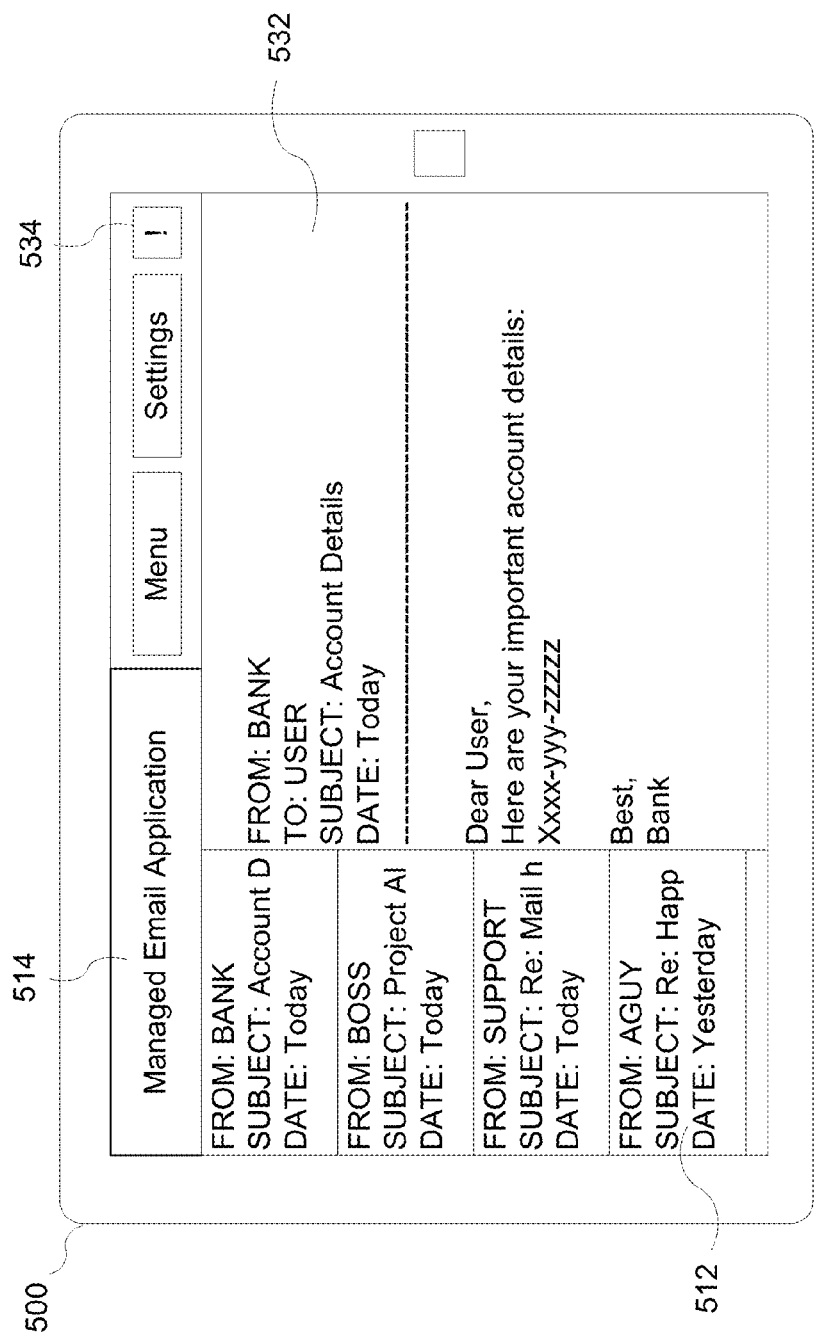

FIG. 5C depicts an illustrative managed application executing on user device 500 and providing user interface 512. User device 500 may generally correspond to user device 500 and be a mobile device enrolled in a managed application framework, similarly to mobile device 202 of FIG. 2. In the example of FIG. 5, the managed application is an email application. The managed email application may operate to provide access to enterprise email services in a secured manner, as described above in regard to FIG. 2. The email application may provide a list of emails, email content, and controls for operating and/or configuring the email application. For example, the user interface 512 associated with the email application may include a content area 532 for displaying the content of an email message.

User interface 512 may also include a remote assistance control 534. Remote assistance control 534 may be operable to initiate a request for remote assistance from an administrator and/or other support professional. A local user of user device 500 may tap or otherwise activate remote assistance control 534 and a request for remote assistance will be sent to a remote support server, such as remote support server 320 of FIG. 3.

Email content displayed in content area 532 may be considered sensitive by a user, for example. The user may desire that content area 532 be hidden from an administrator or other support professional providing remote assistance. Accordingly, a remote assistance policy may specify that content area 532 should be blurred or otherwise hidden in any screen content sent to a remotely accessing user such as an administrator. In some embodiments, the managed application may be preconfigured to treat certain portions of a user interface as sensitive and not subject to exposure via remote assistance. For example, the managed email application may be configured to cause content area 532 to be hidden in any screen content sent by user device 500 to an administrator providing remote assistance. In other embodiments, the user may express a preference regarding portions and/or content of a user interface that should and should not be made available via remote support services. The managed application may provide the user with options to specify user interface controls, regions, and content that should not be exposed via remote assistance.

FIG. 6A depicts an example user interface 610 that may be viewed by an administrator providing remote assistance to a managed user device, such as managed user device 500 of FIG. 5A. User interface 610 may be generated by a remote support server and accessed by the administrator through admin remote assistance console 600, which may be presented on an admin console device. The user interface may include a representation of the managed user device, such as through graphic element 602. User interface 610 may correspond to a user interface presented by the managed user device for which remote assistance is provided. User interface 610 presented on admin remote assistance console 600 may include a remote assistance notification 630 indicating that remote assistance is active. Remote assistance notification 630 may also be provided on the managed user device so that a local user is aware that an administrator and/or other support professional is remotely controlling the user device.

User interface 610 may correspond to a user interface generated by the managed user device as a result of executing a managed application, such as the managed email application illustrated in FIG. 5A. The managed application may include a remote assistance request control 615, which may have been operated by a local user to request the remote assistance. As discussed above in regard to FIG. 5C, an application such as the managed email application may contain personal and/or sensitive content. One or more remote assistance policies may specify whether this personal and/or sensitive content is to be obscured and/or hidden in user interface 610, sent by the managed device to the remote support server. In the example illustrated in FIG. 6A, a remote assistance policy may specify that content area 620 should be obscured during remote assistance sessions. When the managed device sends screen content including the user interface generated as a result of the managed email application, the managed device may modify the screen content to obscure content area 620 as illustrated through diagonal lines. Content area 620 may be obscured and/or hidden such that the remote administrator is unable to view the personal and/or sensitive information.

Using user interface 610 and through admin remote assistance console 600, the administrator may interact with the managed application and provide remote assistance. The administrator may provide any suitable type of user input, including touch, mouse, and keyboard input (and others), to the managed device through the remote support server. The remote support server may send the administrator's user input to the managed device. The managed device may receive the user input and process it according to the one or more remote assistance policies, as described above.

FIG. 6B illustrates user interface 610 as updated in response to the administrator selecting the settings function of the managed email application. For example, the administrator may have clicked on a settings button included in user interface 610. The remote support server may receive this user input from the admin console device and forward it to the managed user device. The managed user device may process the received user input and respond in line with the remote assistance policies. In the example illustrated in FIG. 6B, the administrator has requested the settings page of the application. This may be allowed by the remote assistance policies, whereas, for example, the remote assistance policies may not allow the administrator to return to a main homescreen of the managed device. The managed user device may send the command to the managed application and generate an updated user interface. User interface 610 updates in admin remote assistance console 600 to reflect the new state of the managed application executing on the managed user device. An interface presented locally by the managed user device may also be updated to reflect the current state of the executing application.

As can be seen in FIG. 6B, the administrator is presented with the settings menu for the managed email application. However, this screen also includes personal and/or sensitive user data in the form of a user name and a password in fields 625. A remote assistance policy associated with the managed application and/or device may indicate that user names and passwords should be obscured and/or hidden from the administrator. Accordingly, the managed user device may modify the screen content sent to the remote support server to obscure the user name and password fields 625, thereby preventing that information from being exposed during the remote assistance session.

Figure 7A:
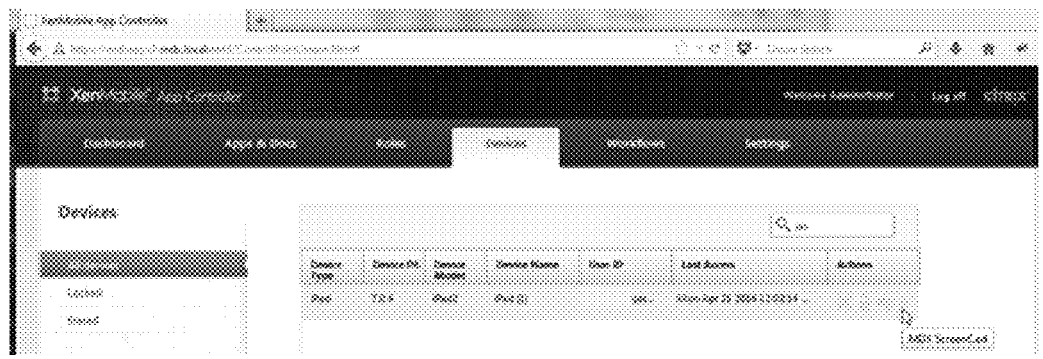
FIGS. 7A and 7B depict example user interfaces according to one or more illustrative aspects discussed herein.
Figure 7B:

FIGS. 7A and 7B illustrate an example of user interfaces screens according to one embodiments of one or more aspects disclosed herein.

FIG. 7A illustrates a remote assistance support console that may be provided by a remote support server to an administrator and/or other support professional. The remote assistance support console may provide the administrator with a list of devices enrolled in the managed application system and allow the administrator to select a managed device to remotely access or control. The remote assistance support console may further provide the administrator with an indication of a request from a user for remote support.

FIG. 7B illustrates the remote assistance support console after the administrator has selected to initiate remote assistance of a managed device. As illustrated in FIG. 7B, the administrator is able to remotely control and provide assistance in a spreadsheet application executing on the managed device. The administrator may interact with the spreadsheet application by providing user input, and the spreadsheet application user interface may update in response to the administrator's input.

As a result of one or more aspects discussed above, an administrator and/or other support professional may be able to provide remote assistance to a managed user device without unnecessary exposure of user personal data and/or applications. One or more aspects discussed herein may maintain the separation between managed and unmanaged application space on a user device participating in a BYOD environment. Users may still be able to receive remote assistance without granting administrators access to personal data on their device.

As illustrated above, various aspects of the disclosure relate to providing remote for a managed computing device that contains managed and unmanaged applications, particularly where it is desirable to limit an administrator's access to personal data and/or applications on the managed computing device. Although the subject matter has been described in language specific to structural features and/or methodological acts, it is to be understood that the subject matter defined in the appended claims is not necessarily limited to the specific features or acts described above.

Rather, the specific features and acts described above are described as some example implementations of the following claims.

What is claimed is:

1. A method comprising:
initiating, by a managed mobile device comprising at least one processor, a network interface, and a memory storing a remote assistance policy set comprising one or more remote assistance policies, a remote assistance connection with a remote support server via the network interface;
receiving, by the managed mobile device, via the remote assistance connection initiated with the remote support server, remote assistance input provided by a user of an administrator console device, the remote assistance input being received by the remote support server via an interface provided by the remote support server to the administrator console device;
processing, by the managed mobile device, the remote assistance input based on the remote assistance policy set, wherein processing the remote assistance input based on the remote assistance policy set comprises:
enforcing a first access policy of the remote assistance policy set that allows the user of the administrator console device to control one or more managed applications on the managed mobile device to which one or more enterprise policies are applied; and
enforcing a second access policy of the remote assistance policy set that prevents the user of the administrator console device from controlling one or more unmanaged applications on the managed mobile device to which the one or more enterprise policies are not applied; and
sending, by the managed mobile device, to the remote support server, one or more user interface updates based on processing the remote assistance input based on the remote assistance policy set.

2. The method of claim 1, wherein initiating the remote assistance connection with the remote support server comprises:
receiving a request for remote control from the remote support server;
determining, based on the remote assistance policy set, whether to grant the request for remote control; and
establishing the remote assistance connection with the remote support server based on determining to grant the request for remote control.

3. The method of claim 1, wherein initiating the remote assistance connection with the remote support server comprises:
receiving a request for remote assistance from a local user of the managed mobile device;
sending a message requesting remote assistance to one or more of the remote support server or the administrator console device; and
establishing the remote assistance connection with the remote support server.

4. The method of claim 1, wherein processing the remote assistance input based on the remote assistance policy set comprises:
determining whether the remote assistance input is allowed based on an input policy of the remote assistance policy set; and
providing the remote assistance input to an application on the managed mobile device when it is determined that the remote assistance input is allowed.

5. The method of claim 1, wherein processing the remote assistance input based on the remote assistance policy set comprises enforcing a first input policy of the remote assistance policy set that limits actions that are performable by the user of the administrator console device.

6. The method of claim 1, wherein processing the remote assistance input based on the remote assistance policy set comprises enforcing a second input policy of the remote assistance policy set that limits portions of a user interface that are operable by the user of the administrator console device.

7. The method of claim 1, wherein sending the one or more user interface updates comprises sending at least one user interface update based on a first screen content policy of the remote assistance policy set that obscures portions of a user interface generated by the managed mobile device.

8. The method of claim 1, wherein sending the one or more user interface updates comprises sending at least one user interface update based on a second screen content policy of the remote assistance policy set that obscures content matching one or more criteria.

9. The method of claim 1, comprising:
receiving, by the managed mobile device, via the remote assistance connection initiated with the remote support server, from the user of the administrator console device, a request to override at least one policy of the remote assistance policy set;
determining whether to approve the request to override the at least one policy of the remote assistance policy set; and
based on determining to approve the request to override the at least one policy of the remote assistance policy set, bypassing, by the managed mobile device, the at least one policy of the remote assistance policy set during processing the remote assistance input based on the remote assistance policy set and sending the one or more user interface updates to the remote support server.

10. The method of claim 9, wherein determining whether to approve the request to override the at least one policy of the remote assistance policy set comprises determining whether the user of the administrator console device is authorized to override the at least one policy of the remote assistance policy set.

11. The method of claim 9, wherein determining whether to approve the request to override the at least one policy of the remote assistance policy set comprises prompting a local user of the managed mobile device to approve the request to override the at least one policy of the remote assistance policy set.

12. The method of claim 1, wherein the interface provided by the remote support server to the administrator console device comprises a web-based user interface.

13. The method of claim 1, comprising:
prior to initiating the remote assistance connection with the remote support server:
determining, by the managed mobile device, based on the remote assistance policy set, whether to establish the remote assistance connection with the remote support server; and
based on determining to establish the remote assistance connection with the remote support server, establishing, by the managed mobile device, the remote assistance connection with the remote support server via the network interface.

14. The method of claim 1, wherein the remote assistance policy set comprises at least one policy having a scope applying to an individual device and at least one policy having a scope applying to a group of devices.

15. The method of claim 1, wherein the remote assistance policy set comprises at least one user-defined policy configured by a local user of the managed mobile device and at least one managed policy associated with a managed application framework.

16. The method of claim 1, comprising:
prior to initiating the remote assistance connection with the remote support server:
providing, by the managed mobile device, a list of applications to the remote support server based on the remote assistance policy set; and
establishing, by the managed mobile device, the remote assistance connection with the remote support server via the network interface, wherein the remote assistance connection provides access to an application selected from the list of applications.

17. One or more non-transitory computer readable media storing instructions that, when executed, cause a managed mobile device comprising at least one processor, a network interface, and a memory storing a remote assistance policy set comprising one or more remote assistance policies, to:
initiate a remote assistance connection with a remote support server via the network interface;
receive, via the remote assistance connection initiated with the remote support server, remote assistance input provided by a user of an administrator console device, the remote assistance input being received by the remote support server via an interface provided by the remote support server to the administrator console device;
process the remote assistance input based on the remote assistance policy set, wherein processing the remote assistance input based on the remote assistance policy set comprises:
enforcing a first access policy of the remote assistance policy set that allows the user of the administrator console device to control one or more managed applications on the managed mobile device to which one or more enterprise policies are applied; and
enforcing a second access policy of the remote assistance policy set that prevents the user of the administrator console device from controlling one or more unmanaged applications on the managed mobile device to which the one or more enterprise policies are not applied; and
send, to the remote support server, one or more user interface updates based on processing the remote assistance input based on the remote assistance policy set.

18. The one or more non-transitory computer readable media of claim 17, wherein initiating the remote assistance connection with the remote support server comprises:
receiving a request for remote control from the remote support server;
determining, based on the remote assistance policy set, whether to grant the request for remote control; and
establishing the remote assistance connection with the remote support server based on determining to grant the request for remote control.

19. The one or more non-transitory computer readable media of claim 17, wherein initiating the remote assistance connection with the remote support server comprises:
receiving a request for remote assistance from a local user of the managed mobile device;
sending a message requesting remote assistance to one or more of the remote support server or the administrator console device; and
establishing the remote assistance connection with the remote support server.

20. A managed mobile device comprising:
at least one hardware processor;
a network interface;
and a memory storing a remote assistance policy set comprising one or more remote assistance policies and instructions that, when executed, cause the managed mobile device to:
initiate a remote assistance connection with a remote support server via the network interface;
receive, via the remote assistance connection initiated with the remote support server, remote assistance input provided by a user of an administrator console device, the remote assistance input being received by the remote support server via an interface provided by the remote support server to the administrator console device;
process the remote assistance input based on the remote assistance policy set, wherein processing the remote assistance input based on the remote assistance policy set comprises:
enforcing a first access policy of the remote assistance policy set that allows the user of the administrator console device to control one or more managed applications on the managed mobile device to which one or more enterprise policies are applied;
and enforcing a second access policy of the remote assistance policy set that prevents the user of the administrator console device from controlling one or more unmanaged applications on the managed mobile device to which the one or more enterprise policies are not applied; and
send, to the remote support server, one or more user interface updates based on processing the remote assistance input based on the remote assistance policy set.

* * * * *